ber 8 are brackets 10 which support the rollers 11, so that the chain 5 contacts with the rollers whereby the latter hold the trolleys and chain directly in line with their supporting rail 3.

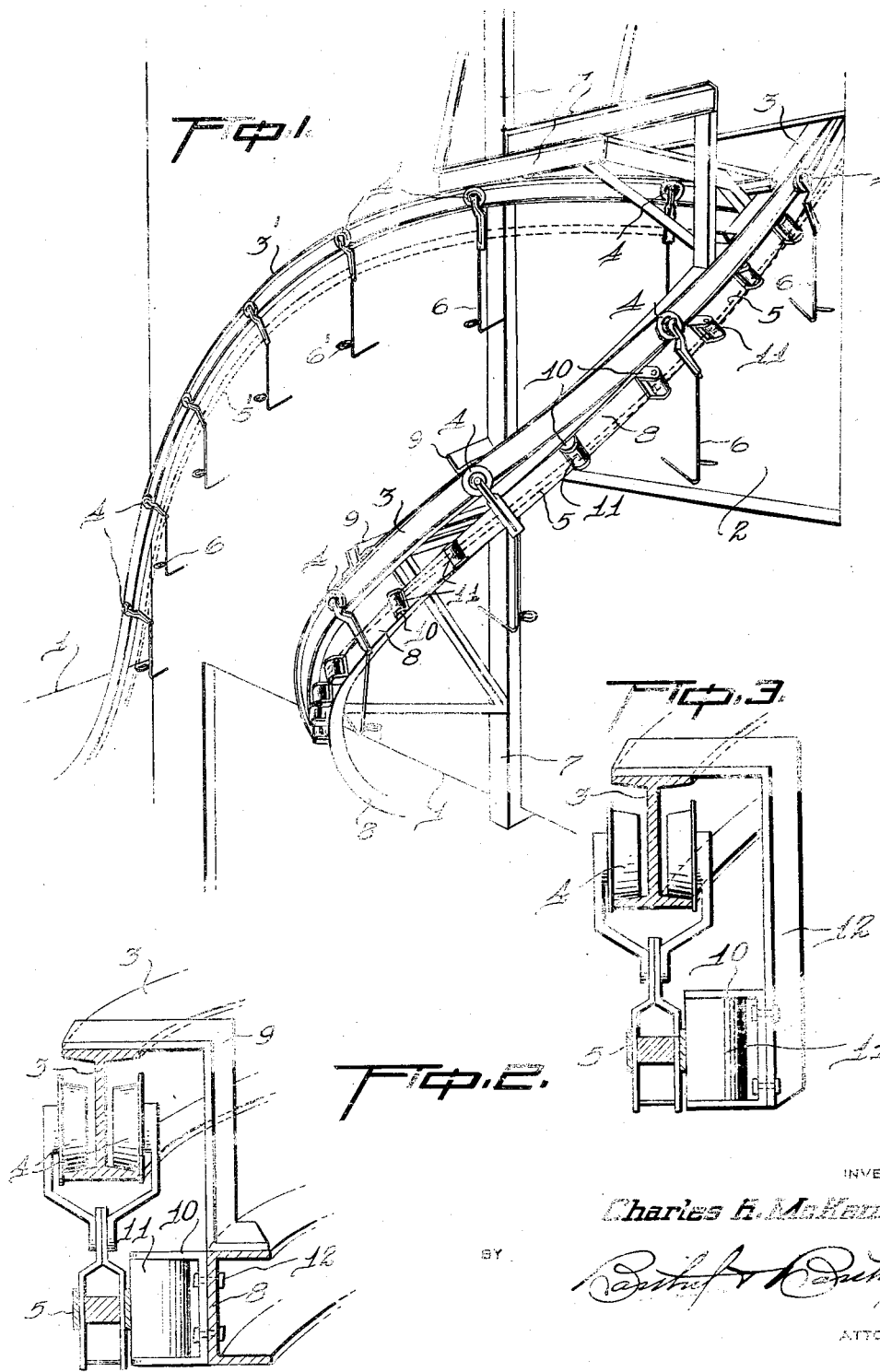

It will be presumed that the conveyer completes a circle inside the room wherein the opening 2 is formed and is then returned to the same level as the opening 1 and in so doing it is returned in the conventional manner in order that a comparison may be had between the conventional type of conveyer and the present novel form. In the conventional form the continuation of the rail 3 is indicated by the numeral 3' having the trolleys 4' propelled along the rail by the chain 5' and supporting the carrying members 6'.

It becomes apparent that the angular disposition of the rollers 11 must be progressively varied so that the axis thereof is at right angles to the line of movement of the chain as it contacts therewith and for this reason the brackets 10 are made as separate units which are attached to the back of the channel member 8 by means of bolts or rivets 12 passed through the brackets and the channel member.

In Fig. 3 there is illustrated a modified form of the present invention which eliminates the channel member 8. In this embodiment there is provided a bracket 12 which is mounted upon the rail 3 and the roller brackets 10 are mounted directly upon the brackets 12 to permit the rollers 11 to be positioned at any angle or position desired.

Although specific embodiments of the present invention have been illustrated and described, it is to be understood that various changes may be made in the details of construction without departing from the spirit of the invention, and such changes are contemplated.

What I claim is:

1. A trolley conveyer comprising a supporting rail bent in the form of a helix, trolleys mounted upon said rail and connected together by a chain, a supporting member supported by said rail and bent to correspond in curvature to said rail, and rollers mounted upon said supporting member to engage said chain.

2. A trolley conveyer comprising a supporting rail bent in the form of a helix, trolleys mounted upon said rail and connected together by a chain, a supporting member supported by said rail and bent to correspond in curvature to said rail, brackets mounted upon said supporting member, and rollers supported by said bracket in a position where said chain engages said rollers as the trolleys move along said rail.

3. A trolley conveyer comprising a pair of spaced rails bent to form a helix, trolleys mounted on one of said rails and connected together by a chain, and rollers mounted upon the other of said rails for engaging said chain.

4. A trolley conveyer comprising a pair of spaced rails bent to form a helix, trolleys mounted on one of said rails and connected together by a chain, removable brackets mounted upon the other of said rails, and rollers supported by said brackets in a position whereby they engage said chain as the trolleys move along the first named rail.

5. A trolley conveyor comprising a pair of spaced rails bent to form a helix, trolleys mounted on one of said rails, a chain connecting said trolleys together and adapted to propel said trolleys along said rail, and means supported by the other of said rails for guiding said chain.

In testimony whereof I affix my signature.

CHARLES A. McKENNY.